United States Patent
Kabele

(10) Patent No.: US 7,110,874 B1
(45) Date of Patent: Sep. 19, 2006

(54) METHOD FOR EVALUATING ENGINE IDLE ROUGHNESS

(75) Inventor: Dennis Frederick Kabele, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 10 days.

(21) Appl. No.: 11/098,099

(22) Filed: Apr. 4, 2005

(51) Int. Cl.
*G06F 17/00* (2006.01)
*F02D 41/16* (2006.01)

(52) U.S. Cl. .................. 701/101; 701/114; 123/339.23

(58) Field of Classification Search ................ 701/101, 701/102, 111, 114; 123/339.17, 339.22, 123/339.23
See application file for complete search history.

(56) References Cited

U.S. PATENT DOCUMENTS 4,674,458 A * 6/1987 Mori .......................... 123/333
5,722,368 A * 3/1998 Sakai ..................... 123/339.23

FOREIGN PATENT DOCUMENTS

JP          9-72237 A  *  3/1997
JP         9-264179 A  * 10/1997

* cited by examiner

*Primary Examiner*—Hieu T. Vo

(57) ABSTRACT

A method is provided for evaluating the acceptability of idle roughness levels in a newly manufactured multi-cylinder internal combustion engine. The method involves calculating a plurality of metrics based upon the relative firing energies of individual cylinders in the engine and setting threshold values for each of the metrics, below which the engine is to be accepted. Similarly, threshold values are set for each of the metrics, above which the engine is to be rejected. The engine is then evaluated to determine if the engine is to be accepted or rejected based upon the calculated metrics and the threshold values for acceptance or rejection set for that metric. If the engine has not been previously accepted or rejected based on a particular metric the engine is evaluated using each of the remaining metrics. If the engine has not been rejected after all metrics have been evaluated the engine is finally accepted.

18 Claims, 2 Drawing Sheets

METHOD FOR EVALUATING ENGINE IDLE ROUGHNESS

FIELD OF THE INVENTION

The present invention relates generally to internal combustion engines. More particularly, the present invention relates to quality control measures in the manufacture of internal combustion engines. Specifically, the present invention relates to a method for evaluating the idle roughness of a newly manufactured engine.

BACKGROUND OF THE INVENTION

Perceived roughness is a common problem for some diesel engines when operating at idle conditions and light loads. Variation of fuel delivery to the different cylinders is one of the major sources of idle roughness. At the engine manufacturing facility it is desirable to conduct diagnostic tests to determine if the idle roughness is acceptable before the engine is shipped.

It has previously been known to provide diagnosis of idle roughness and quality at the engine manufacturing location. One common method, listening to the engine idle in a test cell, is not conclusive as to the level of idle quality. If the idle quality is checked after it is installed in the end vehicle application and found unacceptable, it can be very expensive to make the necessary changes to the fuel system. Some fuel systems do not have the capability to adjust the balance of fuel to the various cylinders at both no load and full load. Fuel injectors are typically calibrated at idle fuel on a test bench before installation in the engine. However, there is variability in the calibration. In addition, the injectors need to be indexed uniformly when installed in the engine and there is further variability in this procedure.

Generally, if the injectors are calibrated properly and if the indexing of the injectors in the engine is accurate, there is no problem with idle roughness. However, if these processes are not controlled, an unsatisfactory level of idle roughness can be present. Thus a method is needed to diagnose the idle roughness quality while the engine is still in the engine manufacturing facility so that problems can be addressed before the engine leaves the facility. A previous method used was a Fourier transform of the engine speed signal. This method worked for cases where the idle roughness was far out of specification. However, it was not sensitive enough to detect the vast majority of idle roughness problems.

SUMMARY OF THE INVENTION

In view of the foregoing, it is an object of the invention to provide a method for evaluating the idle roughness of a newly manufactured internal combustion engine.

Another object of the invention is the provision of a method for evaluating engine idle roughness that calculates unique metrics based upon the relative firing energy of the engine and applies successive accept/reject criteria to determine acceptability.

A further object of the invention is to provide such a method that is inexpensive to implement and is compatible with known manufacturing and testing techniques.

An additional object of the invention is the provision of a method for evaluating idle roughness that does not significantly increase the cycle time for engine testing.

The foregoing and other objects of the invention together with the advantages thereof over the known art which will become apparent from the detailed specification which follows are attained by a method for evaluating the acceptability of idle roughness levels in a newly manufactured multi-cylinder internal combustion engine comprising the steps of: calculating two or more metrics based upon relative firing energies of individual cylinders in the engine; setting a first threshold value for each of the two or more metrics, below which the engine is to be accepted; setting a second threshold value for each of the two or more metrics, above which the engine is to be rejected; evaluating the engine to determine if the engine is to be accepted or rejected based upon a first calculated metric and the threshold values for acceptance or rejection set for that metric; and, if the engine has not been previously accepted or rejected, evaluating the engine in the same way using the other of the two or more calculated metrics and the threshold values set for each of those metrics.

Other objects of the invention are attained by a method for evaluating the acceptability of idle roughness levels in a newly manufactured multi-cylinder internal combustion engine comprising the steps of: finding the relative firing energy of each cylinder (Energy/Cycle); calculating the following metrics based upon the relative firing energy of each cylinder (Energy/Cycle): —a difference between a maximum Energy/Cycle parameter of all cylinders and a minimum Energy/Cycle parameter of all cylinders; —an average of a maximum Energy/Cycle parameter from all cylinders and a second highest Energy/Cycle parameter; —a highest sum of Energy/Cycle parameters for two consecutive cylinders; —a ratio of a highest sum of Energy/Cycle parameters for two consecutive cylinders to a highest sum of Energy/Cycle parameters of 2 equi-spaced cylinders; —an average of Energy/Cycle parameters of a 3 highest cylinders; —a maximum firing acceleration among all the cylinders; setting threshold values for acceptance and rejection of the engine for each of the metrics; and, evaluating the engine to determine whether the engine should be accepted or rejected based upon the calculated metrics and the threshold values for each of the metrics.

In general, a method is provided for evaluating the acceptability of idle roughness levels in a newly manufactured multi-cylinder internal combustion engine. The method involves calculating a plurality of metrics based upon the relative firing energies of individual cylinders in the engine and setting threshold values for each of the metrics, below which the engine is to be accepted. Similarly, threshold values are set for each of the metrics, above which the engine is to be rejected. The engine is then evaluated to determine if the engine is to be accepted or rejected based upon the calculated metrics and the threshold values for acceptance or rejection set for that metric. If the engine has not been previously accepted or rejected based on a particular metric the engine is evaluated using each of the remaining metrics. If the engine has not been rejected after all metrics have been evaluated the engine is finally accepted.

The examples used herein are specifically applied to a four-stroke engine where each cylinder fires once per two revolutions of the crankshaft. The invention can also be applied in a similar manner to a two-stroke engine where each cylinder fires once per revolution of the crankshaft. This invention also applies only to engines with equally spaced firing intervals.

The present invention utilizes a speed signal from a magnetic pickup operating on a camshaft gear to determine the variation in rpm during the firing of the various cylinders. It calculates unique metrics and applies successive accept/reject criteria to determine acceptability of the engine with respect to idle roughness. Alternative methods of measuring engine speed can also be utilized. Examples include, but are not limited to, a) a magnetic pickup operating on a gear which rotates at a speed proportional to the crankshaft speed, or b) an encoder mounted on the crankshaft or another shaft which rotates at a speed proportional to the crankshaft speed.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

The developed algorithms are unique for both 4 and 5 cylinder engines models. Thus the test system needs to detect the number of engine cylinders from e.g. the bar code information and use the appropriate data reduction program.

Raw voltage is sampled from a speed sensor that is aligned with a camshaft drive gear. From that data, zero crossings of the voltage signal are detected to calculate the instantaneous camshaft rpm for each gear tooth passage. For 4 cylinder engines, 5 consecutive minimum rpm values, or "valleys" are located and stored. For 5 cylinder engines, 6 consecutive minimum rpm values, or "valleys" are located and stored, etc. The number of teeth on the camshaft gear must be such that an integer number of teeth corresponds to the interval between the firing of consecutive cylinders. For example, with 60 teeth on the camshaft gear and a 4-cylinder engine with even firing intervals, there will be 60/4=15 teeth per firing interval. For a 5-cylinder engine with 60 teeth on the camshaft, there will be 60/5=12 teeth per firing interval. Those having skill in the art will recognize that there are various alternate methods of measuring engine speed which can also be utilized. Examples include, but are not limited to, a) a magnetic pickup operating on a gear which rotates at a speed proportional to the crankshaft speed, or b) an encoder mounted on the crankshaft or another shaft which rotates at a speed proportional to the crankshaft speed.

The relative Energy/Cycle parameters, average rpm, and accelerations for use in six (6) Idle Roughness Metrics are calculated.

Figure 1:
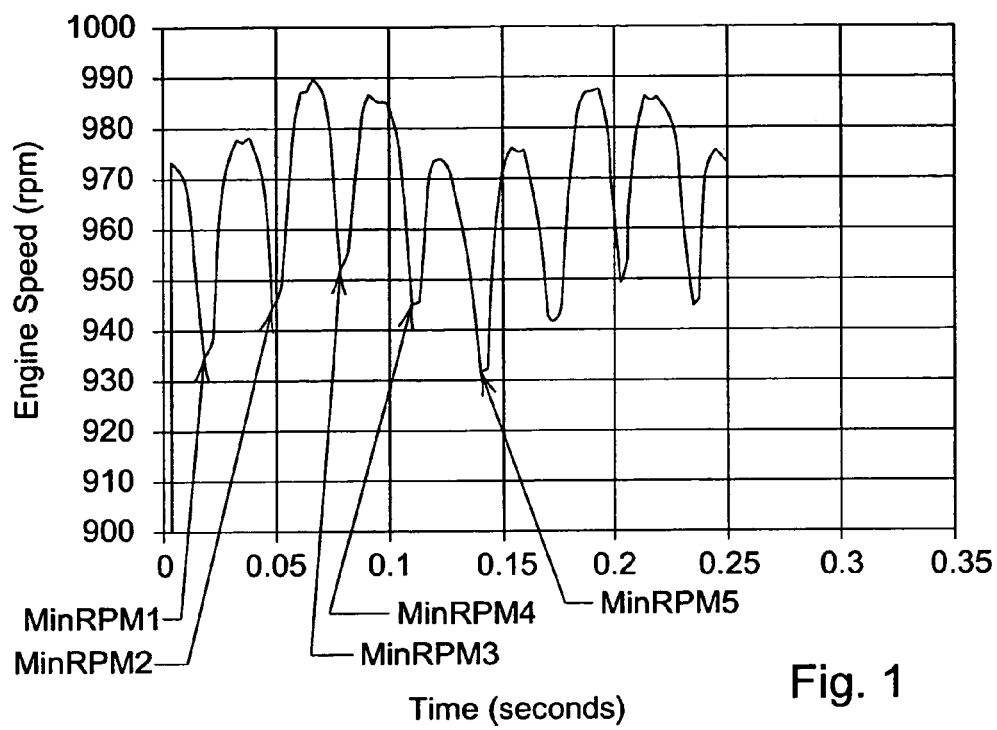
FIG. 1 is a graph wherein engine speed is plotted against time for purposes of determining minimum rpm values for each cylinder of a 4-cylinder engine.

First the local minimums are determined from the instantaneous engine idle rpm curve. A sample curve for a 4 cylinder engine is illustrated in FIG. 1. More particularly, 5 consecutive local minimums or "valleys" are selected. The changes in minimum rpm from cycle to cycle represent the relative strengths of each cylinder firing after the compression stroke. The stronger the firing of the cylinder, the greater will be the minimum rpm value. Ideally, for smooth idle noise, all local minimums would have the same value. In a 4-cylinder engine, the first "valley" and the fifth "valley" correspond to the same individual cylinder. If the engine is running at a stable time-averaged speed, these two "valleys" will be equal. For a 5-cylinder engine, the first "valley" and the sixth "valley" would correspond to the same individual cylinder. If the engine is running at a stable time-averaged speed, these two "valleys" will be equal.

Figure 2:
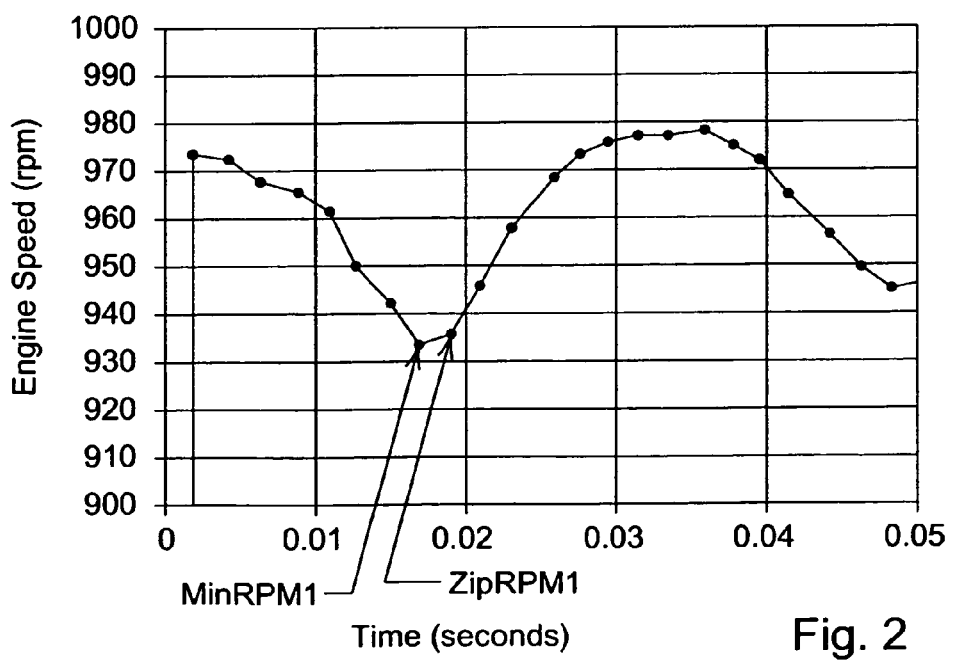
FIG. 2 is a graph wherein engine speed is plotted against time for purposes of determining the ZipRPM value for a particular cylinder; and, FIG. 3 is a flowchart illustrating the steps for evaluating an engine for idle roughness.

A point, herein referred to as the ZipRPM point, is next found. This is the adjacent rpm data point just after each local minimum, or valley as illustrated in FIG. 2. As will be described in more detail below, the ZipRPM point is used to calculate what is herein referred to as the "Zip Max" parameter, which is the instantaneous acceleration. After the local minimums are identified, then the next rpm data point for each local minimum rpm is located.

Next the Energy/Cycle parameter is found. Specifically, the relative firing energy of each cylinder is calculated using following the example formulae (for a 4-cylinder engine):

$$\text{Energy/Cycle}_1 = ((\text{MinRPM}_2)^2 - (\text{MinRPM}_1)^2)/\text{Average}(\text{MinRPM}_1, \ldots \text{MinRPM}_4)$$

$$\text{Energy/Cycle}_2 = ((\text{MinRPM}_3)^2 - (\text{MinRPM}_2)^2)/\text{Average}(\text{MinRPM}_1, \ldots \text{MinRPM}_4)$$

$$\text{Energy/Cycle}_3 = ((\text{MinRPM}_4)^2 - (\text{MinRPM}_3)^2)/\text{Average}(\text{MinRPM}_1, \ldots \text{MinRPM}_4)$$

$$\text{Energy/Cycle}_4 = ((\text{MinRPM}_5)^2 - \text{MinRPM}_4)^2)/\text{Average}(\text{MinRPM}_1, \ldots \text{MinRPM}_4)$$

Next the second highest Energy/Cycle parameter is determined from the Energy/Cycle calculations as follows:

$$\text{Second Highest} = \text{Max}(3 \text{ Lowest Energy/Cycle parameters})$$

Next a parameter herein referred to as the "Oneness" parameter is found:

$$\text{Oneness} = \text{Max}(\text{Energy/Cycle1}, \ldots 4)$$

The highest sum of 2 equi-spaced cylinders, herein referred to as the "Twoness Even" parameter, is found as follows:

$$\text{Twoness Even} = \text{Max}(\text{Energy/Cycle1} + \text{Energy/Cycle3}, \text{Energy/Cycle2} + \text{Energy/Cycle4})$$

The Twoness Even parameter is defined only for engines having an even number of cylinders. In engines having an odd number of cylinders e.g. 5 cylinders the Twoness Even parameter does not exist because there are no two cylinders which fire exactly one revolution apart.

The Zip parameters for each cylinder are calculated. The Zip parameter is the average angular acceleration for the 12° period between the local minimum rpm point and the next rpm data point, where 12 is the number of crank degrees between cam gear teeth:

$$\text{Zip}_1 = (\text{ZipRPM}_1 - \text{MinRPM}_1)/12$$

$$\text{Zip}_2 = (\text{ZipRPM}_2 - \text{MinRPM}_2)/12$$

$$\text{Zip}_3 = (\text{ZipRPM}_3 - \text{MinRPM}_3)/12$$

$$\text{Zip}_4 = (\text{ZipRPM}_4 - \text{MinRPM}_4)/12$$

Next a parameter herein referred to as Max Spread is calculated, wherein:

$$\text{MAX SPREAD} = \text{Max}(\text{Energy/Cycle}_{1,\ldots,4}) - \text{Min}(\text{Energy/Cycle}_{1,\ldots,4})$$

A parameter herein referred to as the Twoness parameter is next found as follows:

$$\text{TWONESS} = \text{Average}(\text{Oneness, Second Highest})$$

A parameter known as the Twoness Uneven Metric is next calculated. Wherein Twoness Uneven is the highest sum of two consecutive cylinders as follows:

$$\text{TWONESS UNEVEN} = \text{Max}[(\text{Energy/Cycle}_1 + \text{Energy/Cycle}_2), (\text{Energy/Cycle}_2 + \text{Energy/Cycle}_3), (\text{Energy/Cycle}_3 + \text{Energy/Cycle}_4), (\text{Energy/Cycle}_4 + \text{Energy/Cycle}_1)]$$

Then the Twoness Uneven/Twoness Even Ratio Metric is calculated:

$$\text{TWONESS UNEVEN/TWONESS EVEN} = \text{TWONESS UNEVEN parameter}/\text{TWONESS EVEN parameter}$$

The metric, Twoness Uneven/Twoness Even applies only to the 4-cylinder engine. Those having skill in the art will recognize that similar algorithms can also be applied to other engine configurations, such as engines with 3 and 6 cylinders.

Next the average of the 3 highest cylinders is determined, this is known as the Threeness parameter:

$$\text{THREENESS} = [\text{Sum}(\text{Energy/Cycle}_1, \ldots, \text{Energy/Cycle}_4) - \text{Min}(\text{Energy/Cycle}_1, \ldots, \text{Energy/Cycle}_4)]/3$$

Those having skill in the art will recognize that the metrics, Twoness Uneven/Twoness Even, and Threeness would not apply to a 3-cylinder engine.

A measure of the firing acceleration for each cylinder, known as the Zip Max Metric is calculated as follows:

$$\text{ZIPMAX} = \text{Max}(\text{Zip}_1, \ldots, \text{Zip}_4)$$

The various metrics were derived to determine the extent to which all cylinders are delivering the same amount of net work. If each cylinder delivers exactly the same work, the idle roughness will be minimized.

Other than the Zip parameter, the metrics are derived on a kinetic energy basis from the firing cycle of one cylinder to the firing cycle of the next cylinder. The engine rpm will increase during the period a given cylinder fires, then the rpm will decrease as compression takes place on the next firing cylinder. For a perfect engine, the instantaneous engine rpm will be the same at TDC of each cylinder. The metrics are all related through the energy parameter.

Figure 3:
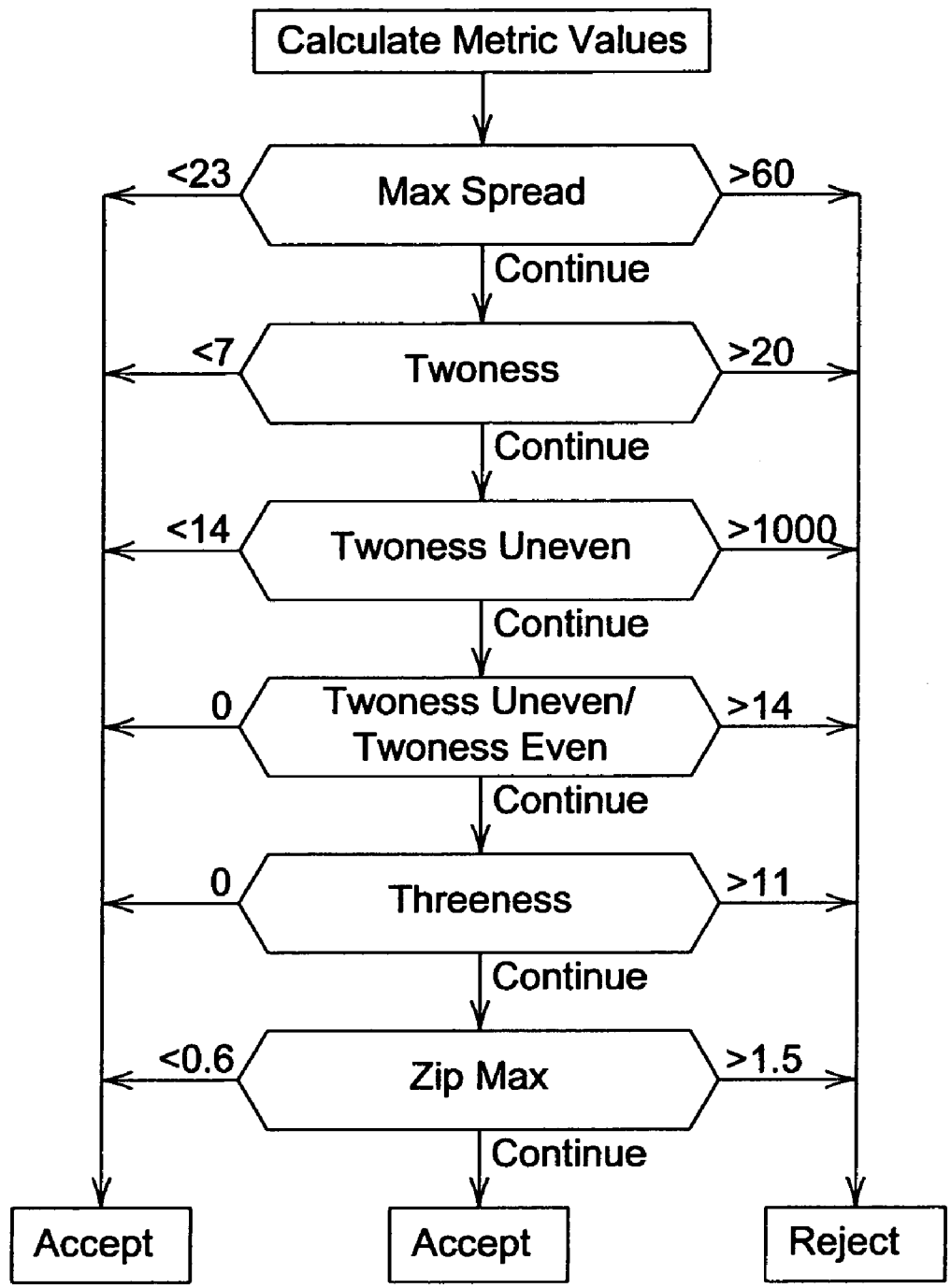

Once the metrics have been calculated they are applied to either accept or reject an engine according to the flow chart of FIG. 3. As shown, each metric has a range of limits for acceptance. It should be noted that the limit values shown in FIG. 3 are by way of example only. Those having skill in the art will recognize that the values used in a particular application can vary from those shown, based upon the particular engines being evaluated and the level of idle quality desired. The score for each metric is compared to the allowable limits for that metric. Acceptance is evaluated in a sequence through each metric in a specified order. The engine is accepted outright if the metric is below a specified value, or rejected outright if it exceeds a specified limit. If the metric value is between the Accept/Reject limits, then the evaluation continues to the next metric in the specified order. If an engine makes it through all the metrics without being rejected, then it is accepted. The limits are set up so that the Twoness Uneven metric can only accept, while the Twoness Uneven/Twoness Even Ratio and Threeness metrics can only reject.

A series of tests was conducted on a large sample of engines, some of which had been previously rejected (subjectively) and some of which had been previously accepted (subjectively). All these engines were rated subjectively from 1–5, with 3 being the minimum acceptable. Then the metric values were plotted against the subjective ratings on a scatter plot. It was found that the "Max Spread" metric could be used to establish a high limit, above which it could be used to reject engines. It could also be used to establish a low limit, below which it could be used to accept engines. The same was done with the other metrics. The order as to which the metrics are applied has been chosen so that as many engines as possible are either accepted or rejected before going to the next metric.

The time taken during engine final test for this method is quite minimal. Each engine is built with a provision for a magnetic pickup on the camshaft gear. The magnetic pickup signal is typically already being used for other tests so there is no additional cost for the engine. This method prevents defective engines from being shipped and it also alerts as to injector calibration problems and assembly problems. The primary advantages of this method are savings in both cost and time.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. A method for evaluating the acceptability of idle roughness levels in a newly manufactured multi-cylinder internal combustion engine comprising the steps of:
    calculating two or more metrics based upon relative firing energies of individual cylinders in the engine;
    setting a first threshold value for each of the two or more metrics, below which the engine is to be accepted;
    setting a second threshold value for each of the two or more metrics, above which the engine is to be rejected;
    evaluating the engine to determine if the engine is to be accepted or rejected based upon a first calculated metric and the threshold values for acceptance or rejection set for that metric; and,
    if the engine has not been previously accepted or rejected, evaluating the engine in the same way using the other of the two or more calculated metrics and the threshold values set for each of those metrics.

2. A method as described in claim 1 wherein the relative firing energy of each cylinder is an Energy/Cycle parameter, and is determined by:

sampling raw voltage signals from a speed sensor that is aligned with a camshaft drive gear;

detecting data zero crossings of the voltage signal;

calculating the instantaneous camshaft rpm for each gear tooth passage;

locating and storing consecutive minimum rpm values; and, subtracting the square of the minimum rpm value of the cylinder from the square of the minimum rpm value of a next consecutive cylinder and dividing by the average of minimum rpm values for all cylinders.

3. A method as described in claim 2 wherein one of the two or more metrics is a difference between a maximum Energy/Cycle parameter of all cylinders and a minimum Energy/Cycle parameter of all cylinders.

4. A method as described in claim 2 wherein one of the two or more metrics is an average of a maximum Energy/Cycle parameter from all cylinders and a second highest Energy/Cycle parameter.

5. A method as described in claim 2 wherein one of the two or more metrics is a highest sum of Energy/Cycle parameters for two consecutive cylinders.

6. A method as described in claim 5 wherein the highest sum of Energy/Cycle parameters for two consecutive cylinders metric has threshold values for acceptance and rejection such that the metric can be used only to accept the engine and not to reject the engine.

7. A method as described in claim 2 wherein one of the two or more metrics is a ratio of a highest sum of Energy/Cycle parameters for two consecutive cylinders to a highest sum of Energy/Cycle parameters of two equi-spaced cylinders.

8. A method as described in claim 7 wherein the ratio of a highest sum of Energy/Cycle parameters for two consecutive cylinders to a highest sum of Energy/Cycle parameters of two equi-spaced cylinders metric has threshold values for acceptance and rejection such that the metric can be used only to reject the engine and not to accept the engine.

9. A method as described in claim 2 wherein one of the two or more metrics is an average of Energy/Cycle parameters of a three highest cylinders.

10. A method as described in claim 9 wherein the average of Energy/Cycle parameters of a three highest cylinders metric has threshold values for acceptance and rejection such that the metric can be used only to reject the engine and not to accept the engine.

11. A method as described in claim 2 wherein one of the two or more metrics is a maximum firing acceleration among all the cylinders.

12. A method as described in claim 11 wherein the firing acceleration for each cylinder is an average angular acceleration for a period between the local minimum rpm point and a next adjacent rpm data point, where the period is the number of crank degrees between cam gear teeth.

13. A method for evaluating the acceptability of idle roughness levels in a newly manufactured multi-cylinder internal combustion engine comprising the steps of:

finding a relative firing energy of each cylinder (Energy/Cycle);

calculating the following metrics based upon the relative firing energy of each cylinder (Energy/Cycle):

a difference between a maximum Energy/Cycle parameter of all cylinders and a minimum Energy/Cycle parameter of all cylinders;

an average of a maximum Energy/Cycle parameter from all cylinders and a second highest Energy/Cycle parameter;

a highest sum of Energy/Cycle parameters for two consecutive cylinders;

a ratio of a highest sum of Energy/Cycle parameters for two consecutive cylinders to a highest sum of Energy/Cycle parameters of 2 equi-spaced cylinders;

an average of Energy/Cycle parameters of a 3 highest cylinders;

a maximum firing acceleration among all the cylinders;

setting threshold values for acceptance and rejection of the engine for each of the metrics; and, evaluating the engine to determine whether the engine should be accepted or rejected based upon the calculated metrics and the threshold values for each of the metrics.

14. A method as set forth in claim 13 wherein the relative firing energy of each cylinder (Energy/Cycle) is found by:

sampling raw voltage signals from a speed sensor that is aligned with a camshaft drive gear of the engine;

detecting data zero crossings of the voltage signal;

calculating an instantaneous camshaft rpm for each gear tooth passage;

locating and storing consecutive minimum rpm values; and, subtracting a square of the minimum rpm value of the cylinder from the square of the minimum rpm value of a next consecutive cylinder and dividing by an average of minimum rpm values for all cylinders.

15. A method as described in claim 14 wherein the highest sum of Energy/Cycle parameters for two consecutive cylinders metric has threshold values for acceptance and rejection such that the metric can be used only to accept the engine and not to reject the engine.

16. A method as described in claim 14 wherein the ratio of a highest sum of Energy/Cycle parameters for two consecutive cylinders to a highest sum of Energy/Cycle parameters of two equi-spaced cylinders metric has threshold values for acceptance and rejection such that the metric can be used only to reject the engine and not to accept the engine.

17. A method as described in claim 14 wherein the average of Energy/Cycle parameters of a three highest cylinders metric has threshold values for acceptance and rejection such that the metric can be used only to reject the engine and not to accept the engine.

18. A method as described in claim 14 wherein the firing acceleration for each cylinder is an average angular acceleration for the period between a local minimum rpm point and a next adjacent rpm data point, where the period is the number of crank degrees between cam gear teeth.

* * * * *